United States Patent
Jones et al.

(10) Patent No.: US 10,031,890 B2
(45) Date of Patent: Jul. 24, 2018

(54) COLLAPSIBLE TEXT INPUT BOX

(71) Applicant: GOOGLE LLC, Mountain View, CA (US)

(72) Inventors: Jonah Jones, San Francisco, CA (US); Michelle I-Ching Lee, Philadelphia, PA (US)

(73) Assignee: GOOGLE LLC, Mountain View, CA (US)

( * ) Notice: Subject to any disclaimer, the term of this patent is extended or adjusted under 35 U.S.C. 154(b) by 17 days.

(21) Appl. No.: 15/377,990

(22) Filed: Dec. 13, 2016

(65) Prior Publication Data
US 2017/0091151 A1    Mar. 30, 2017

Related U.S. Application Data

(63) Continuation of application No. 13/472,148, filed on May 15, 2012, now Pat. No. 9,542,361.

(51) Int. Cl.
*G06F 17/00* (2006.01)
*G06F 17/21* (2006.01)
*G06F 17/22* (2006.01)

(52) U.S. Cl.
CPC ........ *G06F 17/211* (2013.01); *G06F 17/2258* (2013.01)

(58) Field of Classification Search
CPC .... G06F 3/0236; G06F 3/0482; G06F 3/0481; G06F 17/243; G06F 17/211
USPC ........................................................ 715/254
See application file for complete search history.

(56) References Cited

U.S. PATENT DOCUMENTS

| | | | |
|---|---|---|---|
| 6,452,597 B1 | 9/2002 | Goldberg et al. | |
| 6,950,502 B1 * | 9/2005 | Jenkins | H04M 3/533 379/88.12 |
| 7,406,663 B2 | 7/2008 | Treibach-Heck et al. | |
| 7,559,021 B2 | 7/2009 | Chen et al. | |
| 2004/0004641 A1 | 1/2004 | Gargi | |
| 2004/0145593 A1 | 7/2004 | Berkner et al. | |
| 2006/0026531 A1 * | 2/2006 | Lin | G06F 9/453 715/809 |

(Continued)

OTHER PUBLICATIONS

Chen et al., "Detecting Web Page Structure for Adaptive Viewing on Small Form Factor Devices," (2003).

(Continued)

*Primary Examiner* — Ryan R Yang
(74) *Attorney, Agent, or Firm* — Marshall, Gerstein & Borun LLP (57) ABSTRACT

A method truncates text entered via a text box user interface element. The method includes displaying a user interface on a display device of a client computing device, where the user interface includes first and second text entry fields within a collapsible text entry box. The method further includes receiving a first stream of characters into the first text entry field, initially displaying all characters of the first stream as the first text entry field receives the first stream, truncating the displayed characters of the first stream, resolving the truncated displayed characters of the first stream to a first object displayed within the collapsible text entry box, receiving a second stream of characters into the second text entry field, and further truncating the displayed characters of the first stream while receiving the second stream of characters into the second text entry field.

20 Claims, 6 Drawing Sheets

(56) References Cited

U.S. PATENT DOCUMENTS

| | | |
|---|---|---|
| 2007/0028161 A1 | 2/2007 | Haugh et al. |
| 2008/0303823 A1 | 12/2008 | Yanagawa |
| 2010/0107061 A1 | 4/2010 | Ramakrishnan et al. |
| 2010/0122161 A1 | 5/2010 | Jardine-Skinner et al. |
| 2010/0145676 A1 | 6/2010 | Rogers |
| 2010/0211908 A1 | 8/2010 | Luk et al. |
| 2012/0290967 A1 | 11/2012 | Scott et al. |

OTHER PUBLICATIONS

International Search Report and Written Opinion for Application No. PCT/US2013/039213, dated Aug. 30, 2013.
International Preliminary Report on Patentability for Application No. PCT/US2013/039213, dated Nov. 27, 2014.
Extended European Search Report for Application No. 13790058.5, dated Jan. 21, 2016.
Office Action for European Application No. 13790058.5, dated May 16, 2018.

\* cited by examiner

COLLAPSIBLE TEXT INPUT BOX

CROSS-REFERENCE TO RELATED APPLICATION

This is a continuation of U.S. patent application Ser. No. 13/472,148, entitled "Collapsible Text Input Box" and filed on May 15, 2012, the disclosure of which is hereby incorporated herein by reference in its entirety.

TECHNICAL FIELD

The present disclosure generally relates to a system and method for inputting text within a text input box within a computer-implemented graphical user interface and, more particularly, to a fixed-width text input box that allows a user to view more than the last portion of text entered within the text box.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Input for user interface text boxes is frequently longer than what is able to be displayed within the box. For example, a complete address including number, street, city, zip code, etc., that is entered in an input box for a user interface of a digital mapping application is usually too long to be displayed fully within the input box. Typically, a fixed-width text input box hides the first-input characters of any text entry as the total number of characters in the box reaches the maximum size or width of the box. By scrolling the text as the user inputs a long address, the user is only able to see the last input characters. Scrolling the entered text limits the user's view to only the last entered text characters. User may then select the text and scroll to various, earlier-entered portions that are now hidden, but such action forces the user to hunt through the entire entry, one character at a time. It is impossible for a user to immediately discern how long any entry is unless he or she scrolls through the entire entry and, even then, the user is only able to see a section of text that is as long as the fixed-width text entry box. Thus, a user cannot easily view the beginning of an entry or other parts of the entry before finishing and entering the text.

Other text boxes resolve one or more entries into objects or "chips" that may be used as input to other elements and functions of a user interface. For example, a text box for a mapping application may include an "origin" entry and a "destination" entry that are resolved to objects that may be selected and dragged to other input areas of a user interface. Entry into text boxes that include multiple entries may be even more crowded as a first entry may crowd the area for the second entry.

SUMMARY

In one embodiment, a computer-implemented method for truncating entered text of a text box user interface element includes displaying a user interface on a display device of a client computing device, where the user interface includes a first text entry field and a second text entry field within a collapsible text entry box. The method further includes receiving a first stream of characters into the first text entry field, initially displaying all characters of the first stream as the first text entry field receives the first stream, truncating the displayed characters of the first stream, resolving the truncated displayed characters of the first stream to a first object displayed within the collapsible text entry box, receiving a second stream of characters into the second text entry field, and further truncating the displayed characters of the first stream while receiving the second stream of characters into the second text entry field.

In another embodiment, a computer device for truncating entered text of a text box user interface element includes one or more processors, one or more memories coupled to the one or more processors, and a display device coupled to the one or more processors. The one or more memories include computer executable instructions stored therein that, when executed by the one or more processors, cause the one or more processors to display a user interface on the display device. The user interface includes a first text entry field and a second text entry field within a collapsible text entry box. The instructions further cause the one or more processors to receive a first stream of characters into the first text entry field, initially display all characters of the first stream as the first text entry field receives the first stream, truncate the displayed characters of the first stream, resolve the truncated displayed characters of the first stream to a first object displayed within the collapsible text entry box, receive a second stream of characters into the second text entry field, and further truncate the displayed characters of the first stream while receiving the second stream of characters into the second text entry field.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Generally speaking, a collapsible text entry box within a graphical user interface may allow a user to view more text while the user types the text into the box. A long string of entered text may be truncated at a visually appealing point after the first entered character. An amount of text entered before the truncation point may be visible while the user enters the remaining text into the text box. The text entered after the truncate point may scroll so that a fixed amount of text after the truncation point is viewable as the user enters it into the box. Where a single text box includes multiple entries (e.g., an "origin" and a "destination" entry in a collapsible text box of a web-implemented mapping system graphical user interface, etc.), various portions of each text entry may be visible during and after the user has entered the text. Each entry may permit the beginning of the input string to be seen in the box as well as a scrolling portion for the end of the entered text. Thus, the user may be able to see both a beginning portion and an ending portion of the text as it is typed into the box. Because the beginning and ending portions of the content do not exceed the width of the box, a user wishing to view the text input box content are relieved from having to scroll through particularly long text entries.

Figure 1:
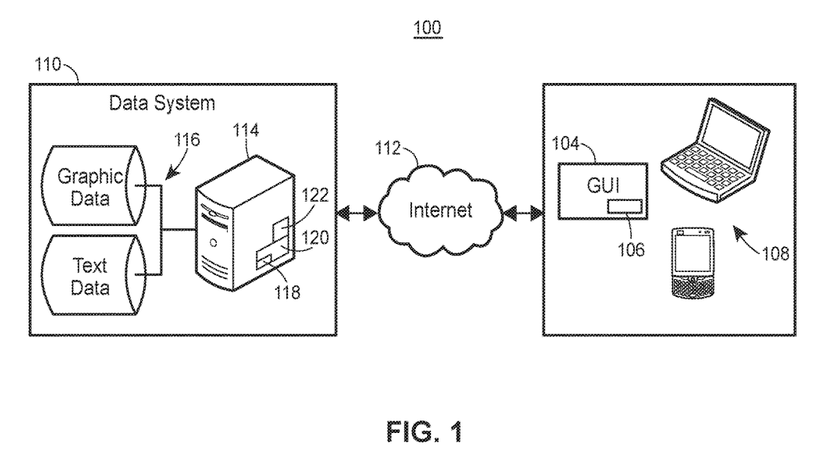
FIG. 1 illustrates a block diagram of a computer-implemented system including a graphical user interface with collapsible text entry boxes for displaying at least a beginning portion and a last entered portion of text during text entry in accordance with the described embodiments.

FIG. 1 illustrates a block diagram of a high-level architecture of a computer system 100 including various software and hardware components or modules that may employ a user interface including a collapsible text box. The various modules may be implemented as computer-readable storage memories containing computer-readable instructions (i.e., software) for execution by a processor of the computer system. The modules may perform the various tasks associated with generating unit tests from source code files, as herein described. The computer system 100 also includes both hardware and software applications, as well as various data communications channels for communicating data between the various hardware and software components. The system 100 may include a computing device 102 that is capable of executing a graphical interface (GUI) 104 including a collapsible text box 106. In some embodiments, a computing device 108 executes instructions of a web-based data system 110 to display the GUI 104 and execute the collapsible text box 106. The device 108 may include a personal computer, smart phone, tablet computer, or other suitable computing device. The GUI 104 may communicate with the system 110 through the Internet 112 or other type of suitable network (e.g., local area network (LAN), a metropolitan area network (MAN), a wide area network (WAN), a mobile, a wired or wireless network, a private network, a virtual private network, etc.). A system server 114 may send and receive information and data 116 for the system 110 such as computer-executable instructions and data associated with applications executing on the computing device 108. The applications executing within the system 100 may include cloud-based applications, web-based interfaces to the data system 110, software applications executing on the computing device 108, or applications including instructions that are executed and/or stored within any component of the system 100. The applications, GUI 104 and collapsible text box 106 may be stored in various locations including separate repositories and physical locations.

In some embodiments, the data system 110 may include computer-executable instructions 118 stored within a memory 120 of the server 114 and executed using a processor 112. The instructions 118 may instantiate a collapsible text box object 106 within a GUI 104 executing in a web browser application of a computing device 108. In some embodiments, the browser application, GUI 104 and collapsible text box 106, and elements of the data system 110 may be implemented at least partially on the server 114. The data system 110 and processor 122 may execute instructions 118 to display the GUI 104 including the collapsible text box 106 within a display of the computing device 108. The GUI 104 may allow a user to access various data 116 within the data system 110, edit or add data 116 to the system 110, and other actions with the system data 116.

Figure 2A:
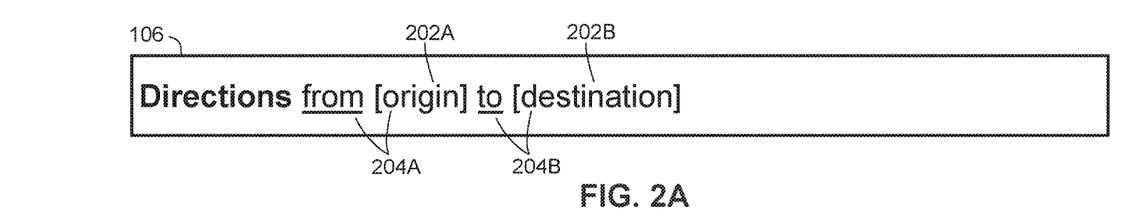
FIGS. 2A-2J illustrate examples of a collapsible text entry box in accordance with the described embodiments.

With reference to FIGS. 2A-2F, a collapsible text entry box 106 may be used within a GUI 104 that interacts with a data system 110. With reference to FIG. 2A, the collapsible text box 106 may include one or more query entry fields 202A and 202B. The query entry fields 202A and 202B may be formatted to accept data for a query to the data system 110 and to initiate a web request instruction including the entered query data to a backend data server 114 of the remote data system 110. In some embodiments, the fields 202A and 202B may include labels, prompts, or other indications 204 of what type of query may be initiated to the data system 110 using the entered data.

Figure 3:
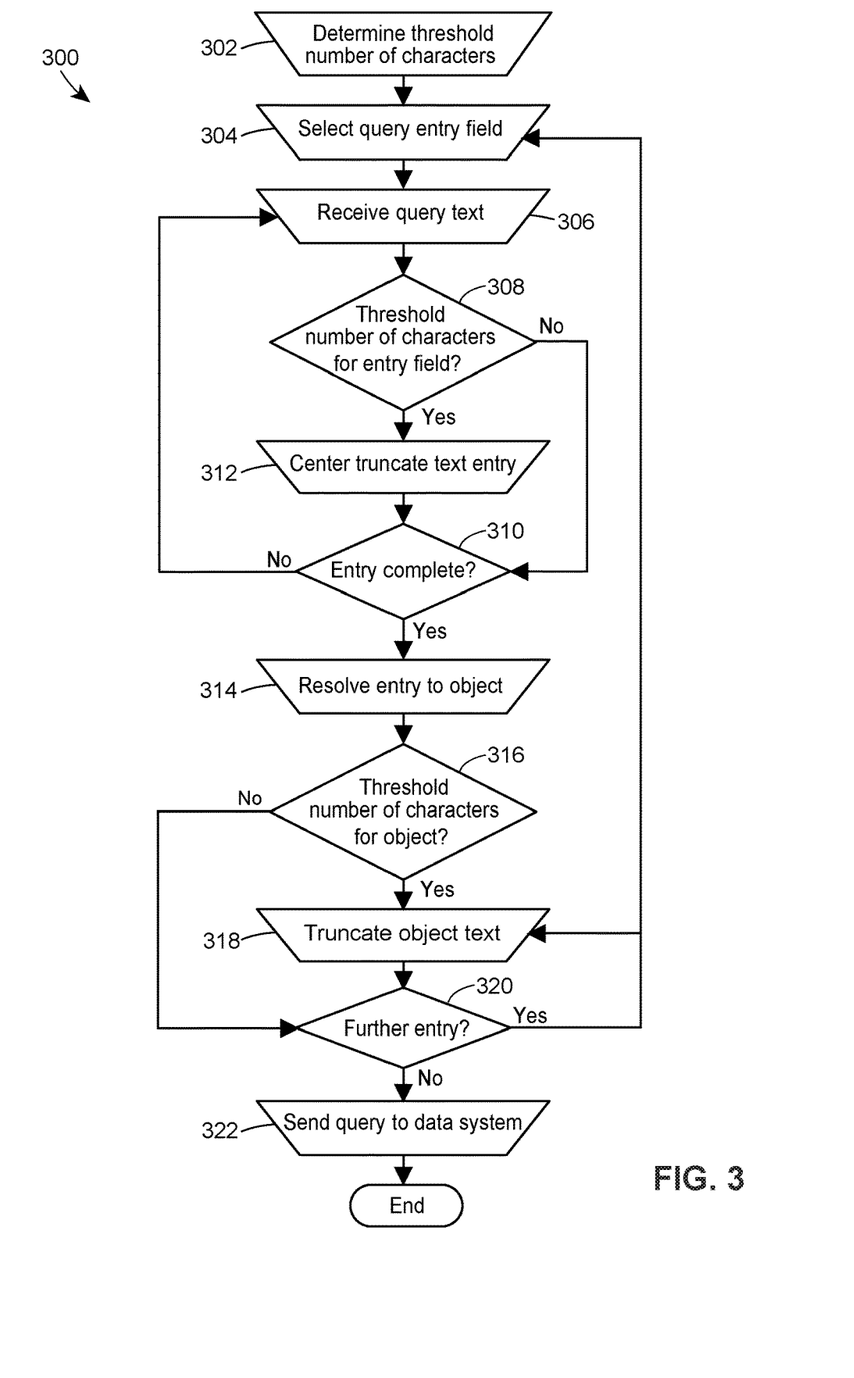
FIG. 3 illustrates an exemplary block diagram of a method for implementing the collapsible text entry box in accordance with the described embodiments.

With further reference to FIG. 3, the system 100 described herein may be employed in a method 300 (FIG. 3) to present text within a collapsible text entry box 106 of a GUI 104 for a data system 110. The method 300 may include one or more functions or routines in the form of computer-executable instructions that are stored in a tangible computer-readable storage medium and executed using a processor of a computing device (e.g., the computing device 108, the server 114, or any combination of computing devices within the system 100). The routines may be included as part of any of the modules described in relation to FIG. 1, or as part of a module that is external to the system illustrated by FIG. 1. For example, the method 300 may be part of a browser application or an application running on the computing device 108 as a plug-in or other module of the browser application. Further, the method 300 may be employed as "software-as-a-service" to provide a computing device 108 with access to the remote data system 110.

With reference to FIGS. 2A-2H, the method 300 may also describe various functions corresponding to first and second elements (e.g., first and second query entry fields, text entries, objects, indicators, etc.). Each step of the method may be performed on either the first or second elements and various combinations of the first and second elements. For example, the truncation functions described below may be performed on either or both of the various first and second elements as herein described.

At function 302, the system 100 may execute an instruction to determine the threshold number of characters for one or more text entry fields 202A, 202B and for the collapsible text entry box 106 itself. The threshold number of characters may be determined by a maximum size or capacity for displayed characters of the text entry field 202A, 202B that is based on a spatial relationship between text entered in the entry fields 202A and 202B and the collapsible text entry box 106. The capacity of the text entry field 202A, 202B may also be based on a size of the collapsible text entry box. The maximum size and spatial relationship may be determined based on several factors such as standard font characteristics (e.g., type, size, kerning, etc.), the size of the collapsible text entry box 106, the standard space between various elements of the box 106 (e.g., each field 202A, 202B, a border of the box, box labels, etc.), etc. For example, once the entered text consumes all free space within the collapsible text box 106 (i.e., visible space within the collapsible text entry box 106 that is not occupied by the combination of labels 204A, 204B, a collapsible text entry box 106 description, one or more object indicators as described below with function 312, etc.), the text may have reached a threshold number of characters. In some embodiments, the threshold number of characters for entered text is set as a configurable parameter for each object (e.g., dimensions of the query entry fields 202A, 202B, dimensions of the collapsible text entry box 106, etc.). The threshold number of characters may be set when the user interface 104 for the data system 110 is created. When the threshold number of characters is a set parameter, the method 300 may access the parameter within each object (e.g., fields 202A, 202B) of the collapsible text entry box 106. In other embodiments, the method 300 may determine the threshold number of characters by comparing various dimensions and parameters of the collapsible text entry box 106. For example, the method 300 may determine the threshold number of characters by comparing a font size, kerning, dimensions of the collapsible text entry box 106 and the query entry fields 202A, 202B, and other factors and dimensions.

At function 304, the system 100 may execute an instruction to select a first or second query entry field 202A, 202B of the collapsible text entry box 106. In some embodiments, a user may select (with a mouse or other pointing device of the computing device 108) a field 202A, 202B as presented within the text box 106 in a GUI 104 displayed on a display device of the computer 108. As shown in FIG. 2A, each query entry field 202A, 202B may include a descriptive label 204A, 204B or other indication of the type of data that a user may enter within the corresponding field 202A, 202B.

Figure 2B:
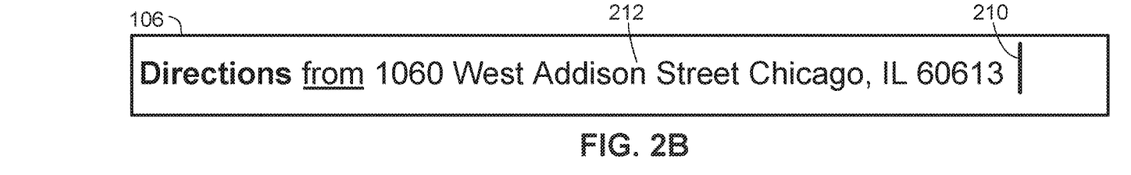

At function 306, the system 100 may execute an instruction to allow a user to enter a query within the area of the selected query entry field 202A, 202B or an instruction to receive a text entry for the field selected at function 304. In some embodiments, the query entry field 202A, 202B may be replaced by a cursor 210 (FIG. 2B) upon selection of the field. The cursor 210 may permit a user to enter text for one or more elements of the query. For example, where the fields 202A, 202B include "origin" or "destination" fields, upon selection of the "origin" field 202A, the system 100 may execute and instruction to replace the label 204A with a cursor 210 and the user may enter an address or other information identifying a first text entry 212 for the origin. As the function 306 receives text in the box 106, the cursor may move right, left, up, or down, depending on the language of the entered text, to allow the entered text to fill the box. In some instances, the first entry 212 in the box 106 may be short enough that the complete entry is visible to the user. For example, as shown in FIG. 2B, the first entry 212 may be entirely visible within the box 106.

At function 308, the system 100 may execute an instruction to determine if the text received at function 306 has reached the threshold number of characters. The threshold number of characters may be determined by a variety of measures, as described above at function 302. If the first text entry 212 has not reached the threshold number of characters, then the method 300 may proceed to function 310 to determine if the text entry 212 is complete. The system 100 may execute a variety of instructions that indicate or determine if the text entry is complete. For example, a text entry 212 may be complete once the system 100 receives an indication that the entry 212 is complete. A user may select a graphic object from the GUI 104 (e.g., by a mouse click, mouse over, or other action with a pointer, pressing an enter key, etc.) that causes the system 100 to execute a function to send the text entry 212 to the data system 110 via the network 112. An indication that the entry 212 is complete may also include causing the system 100 to execute a function to send the text entry to another system (e.g., the data system 100), to save the entry 212, or other action. If the function 310 has not received an indication that the entry 212 is complete, then the method 300 may proceed to function 306. If the function 310 receives an indication that the text entry 212 is complete, then the method 300 may proceed to function 312.

Figure 2C:
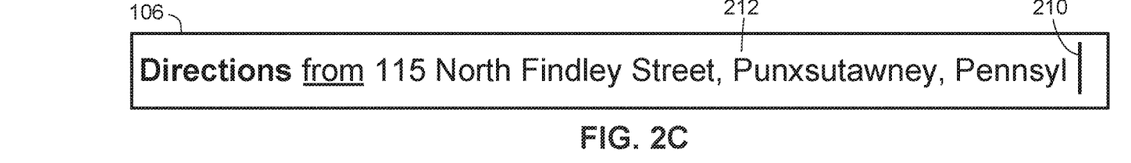
Figure 2D:
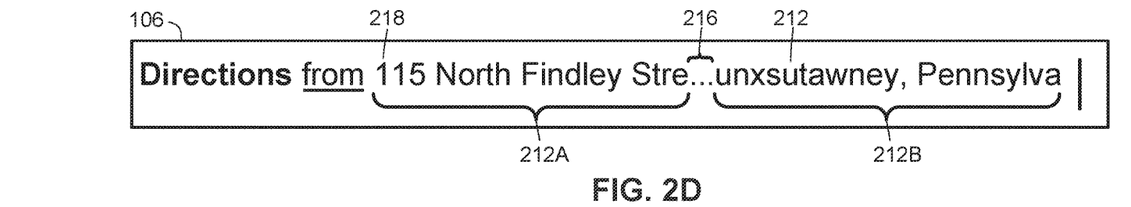

With reference to FIG. 2C, the function 308 may determine that the first text entry 212 has reached the threshold number of characters and the method 300 may execute function 312. At function 312, the system 100 may execute an instruction to truncate the text entry 212 that has exceeded the threshold number of characters. With reference to FIG. 2D, the text entry 212 may be truncated at a truncation point 216 after the first entered character 218 of the entry 212. In some embodiments, the truncation point may include a displayed character after a first displayed character of the received character stream. In further embodiments, function 312 may include instructions to determine a character that is at or near the middle of the entry 212 and remove that a character from the text entry 212 for each character that exceeds the threshold number of characters determined by function 302. The removed characters may be replaced by an indicator. In some embodiments, the truncation point indicator is a fixed size such that the indicator replaces any number of entered characters that exceed the threshold number of characters.

The function 312 may include instructions to truncate the first entry 212 exceeding the threshold number of characters using a variety of methods. In some embodiments, only characters of the left entry portion 212A are removed to accommodate characters exceeding the threshold. In other embodiments, only characters of the right entry portion 212B are removed to accommodate characters exceeding the threshold. In still other embodiments, characters of both the left 212A and right 212B entry portions are removed, either equally or unequally, from both entry portions 212A, 212B.

Figure 2E:
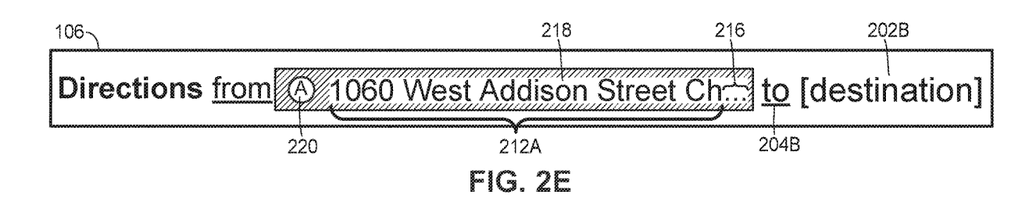
Figure 2F:
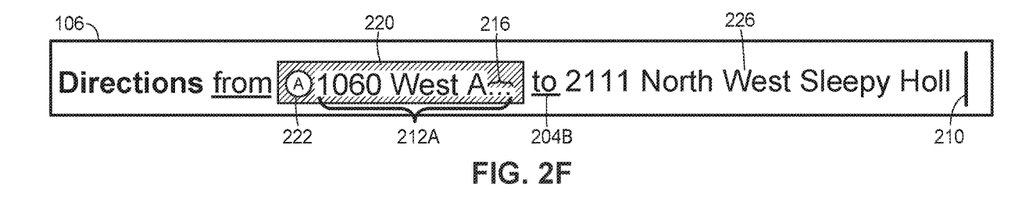

At function 314, the system 100 may execute an instruction to resolve the text entry 212 into a first object 218 (FIG. 2E). Resolving the entry 212 into an object 218 may permit the system 100 to use the first object 218 as an argument for various functions to retrieve data from the data system 110 or other remote systems. For example, where the data system 110 is a web-based mapping system including graphic data, text data, and other data, the first object 218 may be serialized and sent to the data system 110 via the network 112 to be used as an argument in a function for retrieving mapping data 116 from the system 110. With reference to FIG. 2E, the collapsible text entry box 106 may indicate that the system 100 has resolved the first entry 212 into a first object 218. For example, once the system 100 resolves the first entry 212 into the first object 218, a graphical representation of the first object 218 may include a first indicator 220. The object representation may include other indications differentiating it from the entry 212. For example, in some embodiments, the first object 218 may include an outline, different shading or colorization, or other indications that signify to the user that the system 110 has resolved the entry 212 into an object 218.

Upon resolution of the entry 212 to an object 218, the system 100 may execute an instruction to determine if the object has exceeded a threshold number of characters for the displayed object 218 at function 316. As described above in relation to function 302 and 308, the function 316 may determine that the addition of the indicator 220 as well as the label 204B, field 202B, and other objects within the entry box 106 may not leave enough room for the text within the object 218. If so, then at function 318, the system 100 may execute an instruction to truncate the text within the object 218 within the collapsible text box 106 so that a label 204B and a second text entry field 202B are visible within the box 106 (FIG. 2E). Truncation of the first object 218 may include removing a portion of the visible text corresponding to the first entry so that a beginning portion 212A of the first entry 212 is visible within the first object 218 followed by a truncation indicator 216. Upon selection of the second text entry field 202B, the system 100 may execute an instruction to allow a user to enter a second query at a cursor 210 within the second entry field 202B. In some embodiments, the system may execute two or more functions simultaneously as a second query is entered in the second entry field 202B. For example, the object 218 may be additionally truncated using function 318 as the second query is entered using function 304. For example, with reference to FIG. 2F, the first object 218 may be further truncated as a second text entry 226 is entered within the second entry field 202B after the first text entry 212 is resolved to the first object 220. The beginning portion 212A of the text for the object 220 may be shortened beginning at a point nearest the last-entered character of the entry. The last-entered characters of the entry within the beginning portion 212A may be replaced by a symbol (e.g., an ellipsis, etc.) for the truncated portion.

Figure 2G:
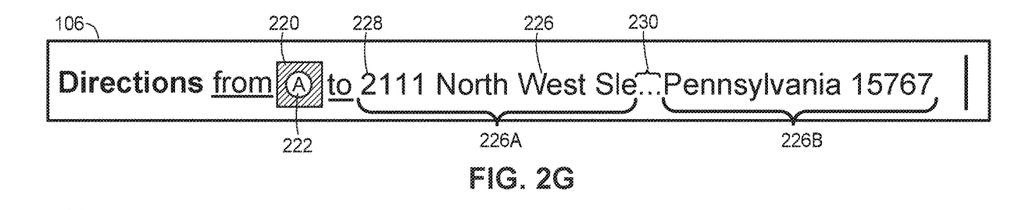
Figure 2H:
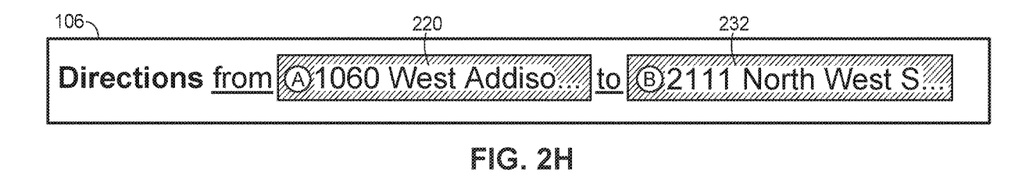

As illustrated by FIG. 2G, the first object 220 may be truncated as the second text entry 226 is entered to remove all visible text from the object 220 leaving the first indicator 222 visible within the object 220. As with the first text entry 212, the second text entry 226 may be truncated as described herein with reference to functions 301, 304, 306, 308, 310, 312, 314, 316 and other functions. For example, the second text entry 226 may be truncated at a truncation point 228 after the first entered character 228 of the second entry 226. Further, a middle character may be removed from the text entry 226 for each character that exceeds the threshold number of characters. The removed characters may be replaced by an indicator 230 similar to the indicator 216. With reference to FIG. 2H, the second text entry may then be resolved to a second object (as described above with reference to function 314), and the displayed text of both the first object and the second object may be truncated. In some embodiments, a number of displayed characters for both the first object and the second object are substantially equal.

At function 322, if no further entries are available in the box 106, the method 300 may send the resolved object(s) 220, 232 to a data system 110. In some embodiments, the interface 104 may receive an indication from a pointer device (mouse, enter key depressed, hover, etc.) to send the resolved objects 220, 232 from the client computing device 102 to the data system 110 via the network 112. At the data system 110, the objects 220, 232 may be used as arguments to retrieve data 116 and return the data to the computing device 102 via the network 112. In some embodiments, the system 110 sends mapping data 116 to the client computing device 102 in a vector format that is used by a mapping application executing on the device 102 to render a map including a route between two locations indicated by the objects 220, 232.

Figure 2I:
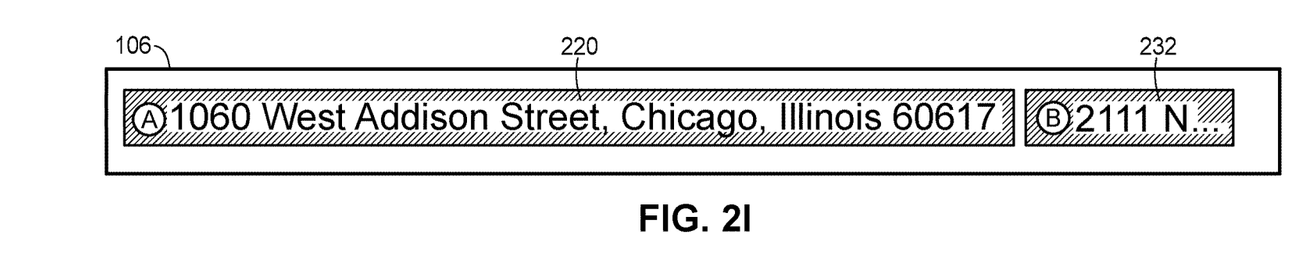
Figure 2J:
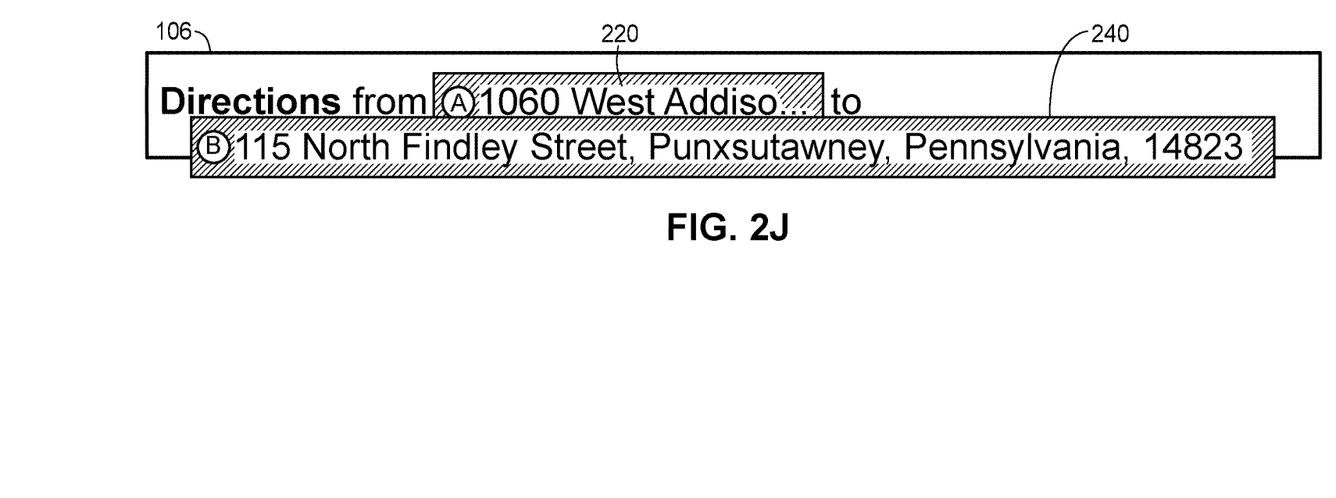

With reference to FIGS. 2I and 2J, once the text entries and fields are resolved into objects 220 and 232, a user may interact with the objects to view the entire stream of text that was received in the respective fields 202A, 202B. A user may interact with the objects 220, 232 by selecting them (e.g., a clicking, hovering, rolling over, or other action to activate the various text display functions as described herein). In one embodiment, a user may select an object 220. Upon selection, a processor of the system 100 may execute instructions to remove various other elements of the collapsible text entry box 106 or reduce other elements in size (or a combination of removing and reducing) so that the entire text stream received into the field 202A (now resolved into the object 220 and displayed as object text) is visible within the box 106. In other embodiments, a user selection may cause a processor to execute instructions that cause the selected object 232 to expand into a temporary overlaid box 240 that may at least partially cover one or more other elements displayed within the box 106. The full stream of text may be displayed upon selection as a hovercard, tooltip, or other type of jQuery plugin, user interface widget, etc.

Figure 4:
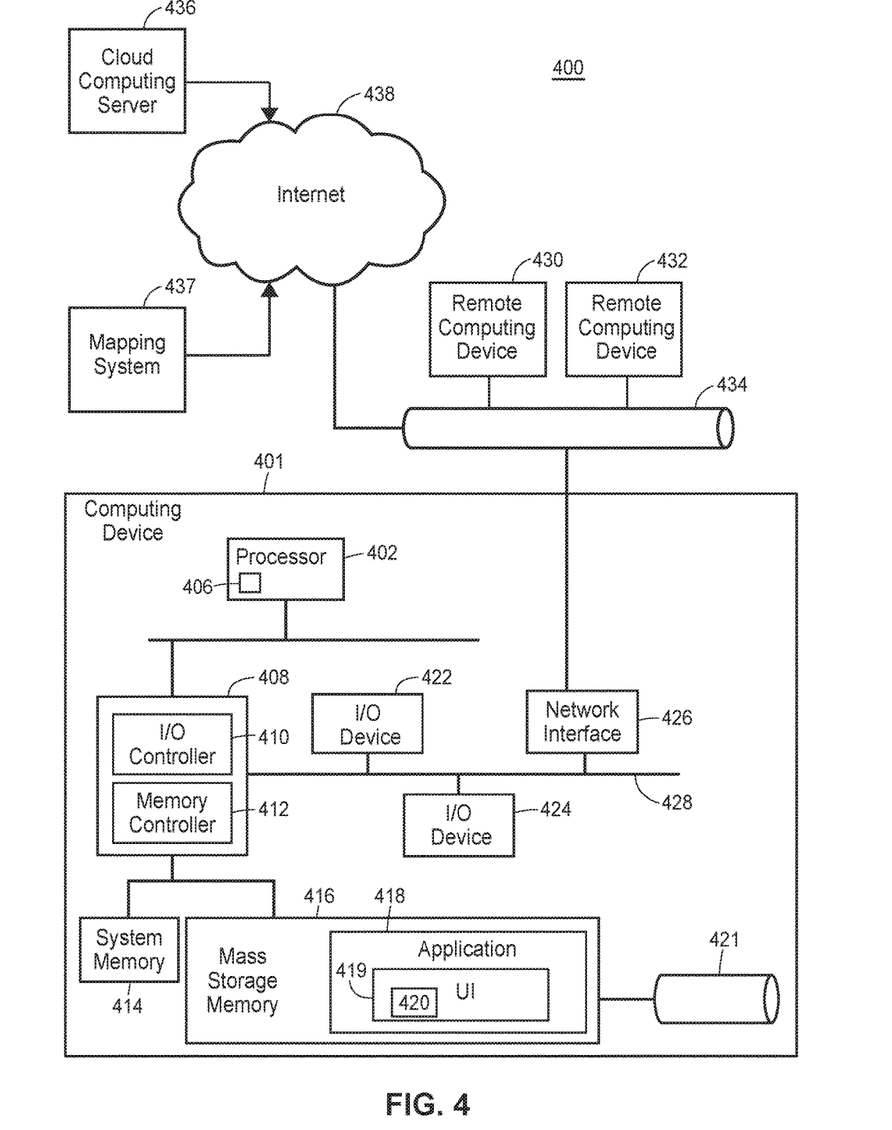
FIG. 4 illustrates a high-level block diagram of a computing environment that implements a collapsible text entry box in accordance with the described embodiments.

FIG. 4 is a high-level block diagram of an example computing environment for a system using a collapsible text box to receive text entries for data requests from a backend data system that may be used to implement the method and systems described herein. The computing device 401 may include a client computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example collapsible text box query entry system 400 may be used to implement and execute the example system of FIG. 1, the example collapsible text entry boxes of FIGS. 2a through 2h, the method of FIG. 4, and the like. Although the example system 400 is described below as including a plurality of peripherals, interfaces, chips, memories, etc., one or more of those elements may be omitted from other example processor systems used to implement and execute the example system 100 including a collapsible text box 106. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416.

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement a C2DM services application 418 having an API 419 (including functions and instructions as described by the method 300 of FIG. 3), the mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. In one embodiment, program functions, modules and routines (e.g., an application 418, a user interface 419, and the collapsible text box 520, etc.) are stored in mass storage memory 416, loaded into system memory 414, and executed by a processor 402 or can be provided from computer program products that are stored in tangible computer-readable storage mediums (e.g. RAM, hard disk, optical/magnetic media, etc.). Mass storage 416 may also include a cache memory 421 storing application data, user profile data, and timestamp data corresponding to the application data, and other data for use by the application 418.

The peripheral I/O controller 410 performs functions that enable the processor 402 to communicate with peripheral input/output (I/O) devices 422 and 424, a network interface 426, via a peripheral I/O bus 428. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 422 and 424 may be used with the application 418 to provide a collapsible text box 106, 520 as described in relation to the figures. The local network transceiver 428 may include support for Wi-Fi network, Bluetooth, Infrared, cellular, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the user interface 104, 419 and collapsible text box 106, 520 on remote computing devices 430 and 432. The remote computing devices 430 and 432 may communicate with the computing device 401 over a network link 434. For example, the computing device 401 may receive location data created by an application executing on a remote computing device 430, 432. In some embodiments, the application 418 including the user interface 104, 519 and collapsible text box 106, 520 may be retrieved by the computing device 401 from a cloud computing server 436 via the Internet 438. When using the cloud computing server 436, the retrieved application 418 may be programmatically linked with the computing device 401. The C2DM services application 418 may be a Java® applet executing within a Java® Virtual Machine (JVM) environment resident in the computing device 401 or the remote computing devices 430, 432. The application 418 may also be "plug-ins" adapted to execute in a web-browser located on the computing devices 401, 430, and 432. In some embodiments, the application 418 may communicate with back end components 440 such as the data system 110 via the Internet 438 or other type of network.

Using the system 100 and method 300 described herein, a collapsible text box 106 within an interface 104 executing on a user's computing device 102 may allow the user to see more relevant portions of text entered into the box. When user-entered text becomes too long to fit within the box 106, the entered text may be truncated at a point other than the first entered character. Instead of merely seeing the last characters a user enters into a text entry field, a user may see a beginning portion as well as an ending portion of the entered text. In some embodiments, the systems and methods described herein may be used with a data system for a digital graphical mapping application. For example, input for mapping user interface text boxes is frequently longer than what is able to be displayed within the box. A complete address including number, street, city, zip code, etc., that is entered in an input box for a user interface of a digital mapping application is usually too long to be displayed fully within the input box. By truncating the text as the user inputs a long address, the user is only able to see the last input characters. Thus, a user cannot easily view the beginning of an entry or other parts of the entry before finishing and entering the text. Further, resolving entries into objects may result in more crowding because a first entry may crowd the area for the second entry. To allow a user to view more of his or her entry while they type it into the box, the systems and methods described herein may truncate a long string of entered text in the middle or some other point that permits the beginning of the input string to be seen in the box. Thus, the user is able to see both a beginning portion and an ending portion of the text as he or she is typing it into the box.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 112, may include but is not limited to any combination of a LAN, a MAN, a WAN, a mobile, a wired or wireless network, a private network, or a virtual private network. Moreover, while only one client computing device is illustrated in FIG. 1 to simplify and clarify the description, it is understood that any number of client computers or display devices are supported and can be in communication with the data system 110.

Additionally, certain embodiments are described herein as including logic or a number of functions, components, modules, blocks, or mechanisms. Functions may constitute either software modules (e.g., code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for providing a collapsible text box through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for truncating entered text of a text box user interface element, the method comprising:
   displaying a user interface on a display device of a client computing device, the user interface including a first text entry field and a second text entry field within a collapsible text entry box;
   receiving a first stream of characters into the first text entry field;
   initially displaying all characters of the first stream as the first text entry field receives the first stream;
   truncating the displayed characters of the first stream;
   resolving the truncated displayed characters of the first stream to a first object displayed within the collapsible text entry box;
   receiving a second stream of characters into the second text entry field; and
   further truncating the displayed characters of the first stream while receiving the second stream of characters into the second text entry field.

2. The computer-implemented method of claim 1, wherein resolving the truncated displayed characters of the first stream to the first object includes:
   determining whether the first object exceeds a threshold number of characters; and
   in response to determining that the first object exceeds the threshold number of characters, further truncating the displayed characters of the first stream within the first object.

3. The computer-implemented method of claim 2, wherein further truncating the displayed characters of the first stream within the first object includes:
   further truncating the displayed characters of the first stream within the first object such that the second text entry field visible within the collapsible text entry box.

4. The computer-implemented method of claim 2, wherein further truncating the displayed characters of the first stream within the first object includes:
   further truncating the displayed characters of the first stream within the first object such that a beginning portion of the displayed characters of the first stream is visible within the first object.

5. The computer-implemented method of claim 4, wherein further truncating the displayed characters of the first stream while receiving the second stream of characters into the second text entry field includes:
   truncating the beginning portion of the displayed characters of the first stream within the first object.

6. The computer-implemented method of claim 1, wherein truncating the displayed characters of the first stream includes:
   truncating the displayed characters of the first stream at a truncation point while receiving the first stream and as a number of the displayed characters of the first stream exceeds a threshold number of characters.

7. The computer-implemented method of claim 1, wherein the truncation point includes a displayed character after a first displayed character of the received first stream.

8. The computer-implemented method of claim 1, wherein truncating the displayed characters of the first stream includes:
   removing a character from the displayed characters of the first stream at the truncation point for each newly received character of the first stream that exceeds a threshold number of characters.

9. The computer-implemented method of claim 8, wherein truncating the displayed characters of the first stream further includes:
   using a single, fixed-size indicator to replace all of the removed characters.

10. The computer-implemented method of claim 1, further comprising:
    truncating the displayed characters of the second stream at a truncation point while receiving the second stream and as a number of the displayed characters of the second stream exceeds a threshold number of characters.

11. The computer-implemented method of claim 10, further comprising:

resolving the truncated displayed characters of the second stream to a second object displayed within the collapsible text entry box.

12. A computer device for truncating entered text of a text box user interface element, the computer device comprising:
one or more processors;
one or more memories coupled to the one or more processors; and
a display device coupled to the one or more processors;
wherein the one or more memories include computer executable instructions stored therein that, when executed by the one or more processors, cause the one or more processors to
displaying a user interface on the display device, the user interface including a first text entry field and a second text entry field within a collapsible text entry box,
receive a first stream of characters into the first text entry field,
initially display all characters of the first stream as the first text entry field receives the first stream,
truncate the displayed characters of the first stream,
resolve the truncated displayed characters of the first stream to a first object displayed within the collapsible text entry box,
receive a second stream of characters into the second text entry field, and
further truncate the displayed characters of the first stream while receiving the second stream of characters into the second text entry field.

13. The computing device of claim 12, wherein the computer executable instructions cause the one or more processors to resolve the truncated displayed characters of the first stream to the first object at least by:
determining whether the first object exceeds a threshold number of characters; and
in response to determining that the first object exceeds the threshold number of characters, further truncating the displayed characters of the first stream within the first object.

14. The computing device of claim 13, wherein the computer executable instructions cause the one or more processors to further truncate the displayed characters of the first stream within the first object at least by:
further truncating the displayed characters of the first stream within the first object such that the second text entry field visible within the collapsible text entry box.

15. The computing device of claim 13, wherein the computer executable instructions cause the one or more processors to further truncate the displayed characters of the first stream within the first object at least by:
further truncating the displayed characters of the first stream within the first object such that a beginning portion of the displayed characters of the first stream is visible within the first object.

16. The computing device of claim 15, wherein the computer executable instructions cause the one or more processors to further truncate the displayed characters of the first stream while receiving the second stream of characters into the second text entry field at least by:
truncating the beginning portion of the displayed characters of the first stream within the first object.

17. The computing device of claim 12, wherein the computer executable instructions cause the one or more processors to truncate the displayed characters of the first stream at least by:
truncating the displayed characters of the first stream at a truncation point while receiving the first stream and as a number of the displayed characters of the first stream exceeds a threshold number of characters.

18. The computing device of claim 12, wherein the computer executable instructions cause the one or more processors to truncate the displayed characters of the first stream at least by:
removing a character from the displayed characters of the first stream at the truncation point for each newly received character of the first stream that exceeds a threshold number of characters.

19. The computing device of claim 18, wherein the computer executable instructions cause the one or more processors to truncate the displayed characters of the first stream further by:
using a single, fixed-size indicator to replace all of the removed characters.

20. The computing device of claim 12, wherein the computer executable instructions further cause the one or more processors to:
truncate the displayed characters of the second stream at a truncation point while receiving the second stream and as a number of the displayed characters of the second stream exceeds a threshold number of characters; and
resolve the truncated displayed characters of the second stream to a second object displayed within the collapsible text entry box.

* * * * *